(12) United States Patent
Kishimoto et al.

(10) Patent No.: US 8,900,044 B2
(45) Date of Patent: Dec. 2, 2014

(54) GAME SYSTEM FOR PROVIDING VIDEO GAMES

(71) Applicant: DeNA Co., Ltd., Tokyo (JP)

(72) Inventors: Yuji Kishimoto, Tokyo (JP); Yuji Ukai, Tokyo (JP); Toshinori Suzuki, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/903,893

(22) Filed: May 28, 2013

(65) Prior Publication Data

US 2013/0324209 A1  Dec. 5, 2013

(30) Foreign Application Priority Data

May 30, 2012  (JP) ................................. 2012-122741

(51) Int. Cl.
*A63F 13/00* (2014.01)
*G07F 17/32* (2006.01)
*A63F 13/30* (2014.01)

(52) U.S. Cl.
CPC ............ *G07F 17/3272* (2013.01); *G07F 17/32* (2013.01); *A63F 13/12* (2013.01)
USPC .......... 463/11; 463/1; 463/9; 463/40; 463/41; 463/42

(58) Field of Classification Search
USPC ........................................ 463/1, 9, 11, 40–42
See application file for complete search history.

(56) References Cited

U.S. PATENT DOCUMENTS

| | | | |
|---|---|---|---|
| 2003/0053119 A1* | 3/2003 | Yamada et al. | 358/1.15 |
| 2005/0033649 A1 | 2/2005 | Okada | 705/26 |
| 2008/0004094 A1* | 1/2008 | Mueller et al. | 463/1 |
| 2009/0051114 A1* | 2/2009 | Robbers et al. | 273/293 |
| 2010/0222142 A1 | 9/2010 | Mori | 463/29 |

(Continued)

FOREIGN PATENT DOCUMENTS

| | | |
|---|---|---|
| JP | 2001/357168 | 12/2001 |
| JP | 2002/073881 | 3/2002 |

(Continued)

OTHER PUBLICATIONS

Japanese Office Action in connection with Japanese Patent Application No. 2012-122741 issued on Aug. 23, 2012.

(Continued)

*Primary Examiner* — Jasson Yoo
(74) *Attorney, Agent, or Firm* — Pillsbury Winthrop Shaw Pittman LLP

(57) ABSTRACT

One object is to provide a server device that enables accurate expectation of cost required to acquire a desired game content. In accordance with one aspect, a server device according to an embodiment of the present invention provides a game to one or more players via a network. This server device includes a won game content selecting unit configured to select one or more game contents as first won game contents from the game contents contained in a first deck allocated to a first player of the one or more players, an owned game content information storage unit configured to store the one or more won game contents in association with the first player identification information, and an updating unit configured to update the first deck by clearing the one or more first won game contents from the first deck.

16 Claims, 17 Drawing Sheets

| Player Identification Information | Deck Identification Information |
|---|---|
| 000001 | D000001 |
| 000002 | D000002 |
| 000003 | D000003 |
| 000004 | D000004 |
| 000005 | D000005 |
| ... | ... |

Deck Identification Information Management Table

Deck Identification Information: D000001

| Game Content Identification Information | Rarity Value | Name | Aggregate Contained Number | Current Contained Number |
|---|---|---|---|---|
| M000001 | 1 | Card A | 50 | 32 |
| M000002 | 2 | Card B | 30 | 21 |
| M000003 | 3 | Card C | 10 | 9 |
| M000004 | 4 | Card D | 1 | 1 |
| M000005 | 1 | Card E | 50 | 29 |
| M000006 | 3 | CardF | 10 | 8 |

Contained Game Content information Management Table

(56) References Cited

U.S. PATENT DOCUMENTS

| | | | | |
|---|---|---|---|---|
| 2010/0304856 | A1* | 12/2010 | Coleman et al. | 463/31 |
| 2011/0294558 | A1 | 12/2011 | Kim | 463/17 |
| 2012/0036189 | A1 | 2/2012 | Sadamoto | 709/204 |

FOREIGN PATENT DOCUMENTS

| | | |
|---|---|---|
| JP | 2002/248265 | 9/2002 |
| JP | 2008/093165 | 4/2008 |
| JP | 2009/089757 | 4/2009 |
| JP | 2009/187143 | 8/2009 |
| JP | 2012/038150 | 2/2012 |
| JP | 2012/516749 | 7/2012 |

OTHER PUBLICATIONS

Japanese Office Action in connection with Japanese Patent Application No. 2012-151933 issued on Aug. 23, 2012.
Japanese Office Action in connection with Japanese Patent Application No. 2012-122741 issued on Jan. 22, 2013.
Japanese Office Action in connection with Japanese Patent Application No. 2012-151933 issued on Jan. 22, 2013.
Japanese Final Office Action in connection with Japanese Patent Application No. 2012-122741 issued on Apr. 30, 2013.
Japanese Final Office Action in connection with Japanese Patent Application No. 2012-151933 issued on Apr. 30, 2013.
Japanese Decision to Decline in connection with Japanese Patent Application No. 2012-151933 issued on Apr. 30, 2013.
GURUMIN Official Guidebook, Shinkigensha, Co., Ltd., Mar. 9, 2005, First Edition, pp. 47-50 and 115.
International Search Report for International Patent Application No. PCT/JP2013/065520 mailed Sep. 11, 2013.
"Magic: The Gathering Online", http://en.wikipedia.org/w/index.php?title=Magic:_The_Gathering_Online&oldid=493127708, 5 pages. Retrieved online on Aug. 15, 2013.
"Magic: The Gathering Online", http://en.wikipedia.org/w/index.php?title=Magic:_The_Gathering&oldid=493315521, 13 pages. Retrieved online on Aug. 19, 2013.
McLeod, John "Rules of Card Games: Spite and Malice," http://web.archive.org/web/20120419022752/http://www.pagat.com/patience/spitemal.html, 4 pages. Retrieved online on Aug. 14, 2013.
Gizmok24: "Lets Play/Tutorial of Magic the Gathering Online", http://www.youtube.com/watch?v=9hs_PF4LMkQ, 1 page. Uploaded online on Feb. 12, 2012.
"Thin Client", http://en.wikipedia.org/w/index.php?title=Thinclient&oldid=493972420, 4 pages. Retrieved online on Aug. 16, 2013.
"Diablo III to Require Constant Internet Connection, No offline mode in Blizzard's anticipated sequel.", (http://www.ign.com/articles/2011/08/01/diablo- iii - to - require -constant- internet- connection) (http://wikiwiki.jp/diablo3blizz/;http://wikiwiki.jp/diablo3blizz/?Extensive%20List%20of%20Basic%20Diablo%203). [online], Aug. 1, 2011.
"The first work of the three-installment 'Star Craft II' now on sale contains 'Terran' campaign. StarCraft II: Wings of Liberty", (http://www.4gamer.net/games/040/G004002/20100804079/). [online] Aug. 6, 2010.
"Battlefield 3 Single Play Preview: Experience Realistic Battle Field through Ultimate Graphics and Staging!", (http://game.watch.impress.co.jp/docs/news/20111026 486434.html). [online], Oct. 26, 2011.
"New gacha, 'Box Gacha' of Mobage is an image fraud," (http://blog.livedoor.jp/goldennews/archives/51721312.html). [online], Aug. 17, 2012.
Monhun with Everyone Card Master, Appli Style, Eastpress Co., Ltd., Apr. 25, 2012, vol. 8, pp. 66-67.
"Gundam Card Collection, Substantially Displaying the Amount of Money Required for a Gacha: See Social Games 12," (htttp://www.Qamecastblog.com/archives/65683438.html). [online], Jun. 10, 2012.
"School Star, What is the Box Gacha for a Limited Time?," (http://www. Xn--u9j960klzgy4b.jp.net/2012/06/post-6.html). "School Star, What is the Box Gacha for a Limited Time?," (http://www. Xn--u9j960klzgy4b.jp.net/2012/06/post-6.html). [online], Aug. 17, 2012.

* cited by examiner

| Player Identification Information | Deck Identification Information |
|---|---|
| 000001 | D000001 |
| 000002 | D000002 |
| 000003 | D000003 |
| 000004 | D000004 |
| 000005 | D000005 |
| ... | ... |

Deck Identification Information Management Table

Fig. 4

Deck Identification Information: D000001

| Game Content Identification Information | Rarity Value | Name | Aggregate Contained Number | Current Contained Number |
|---|---|---|---|---|
| M000001 | 1 | Card A | 50 | 32 |
| M000002 | 2 | Card B | 30 | 21 |
| M000003 | 3 | Card C | 10 | 9 |
| M000004 | 4 | Card D | 1 | 1 |
| M000005 | 1 | Card E | 50 | 29 |
| M000006 | 3 | CardF | 10 | 8 |

Contained Game Content information Management Table

Fig. 5

| Player Identification Information | Owned item 1 | | Owned item 2 | | Owned item 3 | | Owned item 4 | | Owned item 5 | |
|---|---|---|---|---|---|---|---|---|---|---|
| | ID | Number | ID | Number | ID | Number | ID | Number | ID | Number |
| 000001 | M000001 | 8 | M000002 | 5 | M000003 | 1 | M000005 | 6 | N/A | 0 |
| 000002 | M000002 | 3 | M000003 | 1 | M000006 | 4 | M000009 | 3 | M000006 | 1 |
| 000003 | M000001 | 12 | M000002 | 6 | M000004 | 1 | M000006 | 3 | N/A | 0 |
| 000004 | M000002 | 8 | M000003 | 2 | M000005 | 9 | N/A | 0 | N/A | 0 |
| 000005 | M000001 | 7 | M000002 | 10 | M000003 | 1 | N/A | 0 | N/A | 0 |
| ... | ... | | ... | | ... | | ... | | ... | |

Owned Game Content Management Table

Fig. 6

| Player Identification Information | Deck Identification information |
|---|---|
| 000001 | D000001-1 |
| | D000001-2 |
| 000002 | D000002 |
| 000003 | D000003-1 |
| | D000003-2 |
| | D000003-3 |
| 000004 | D000004 |
| 000005 | D000005 |
| ... | ... |

Deck Identification Information Management Table

Fig. 11

Deck Identification Information : D000001-1

| Game Content Type | Rarity Value | Name | Aggregate Contained Number | Current Contained Number |
|---|---|---|---|---|
| M000001 | 1 | Card A | 50 | 32 |
| M000002 | 2 | Card B | 30 | 21 |
| M000003 | 3 | Card C | 10 | 9 |
| M000004 | 4 | Card D | 1 | 1 |
| M000005 | 1 | Card E | 50 | 29 |
| M000006 | 3 | Card F | 10 | 8 |

Contained Game Content Information Management Table

Fig. 12a

Deck Identification Information : D000001-2

| Game Content Type | Rarity Value | Name | Aggregate Contained Number | Current Contained Number |
|---|---|---|---|---|
| M000001 | 1 | Card A | 40 | 32 |
| M000002 | 2 | Card B | 25 | 18 |
| M000003 | 3 | Card C | 20 | 16 |
| M000004 | 4 | Card D | 10 | 7 |
| M000005 | 1 | Card E | 40 | 25 |
| M000006 | 3 | Card F | 20 | 13 |

Contained Game Content Information Management Table

Fig. 12b

| Player Identification Information | Deck Identification Information |
|---|---|
| 000001 | D000001 |
| 000021 | |
| 000022 | |
| 000002 | D000002 |
| 000003 | D000003 |
| 000004 | D000004 |
| 000005 | D000005 |
| ... | ... |

Deck Identification Information Management Table

Fig. 15

Contained Game Medium Information Management Table

Deck Identification Information : D000001

| Game Content Identification Information | Rarity Value | Name | Aggregate Contained Number | Current Contained Number |
|---|---|---|---|---|
| M000001 | 1 | Card A | 50 | 32 |
| M000002 | 2 | Card B | 30 | 21 |
| M000003 | 3 | Card C | 10 | 9 |
| M000004 | 4 | Card D | 1 | 0 |
| M000005 | 1 | Card E | 50 | 29 |
| M000006 | 3 | Card F | 10 | 8 |
| M000007 | 4 | Card G | 2 | 2 |
| M000008 | 1 | Card H | 50 | 50 |

Fig. 16

GAME SYSTEM FOR PROVIDING VIDEO GAMES

CROSS-REFERENCE TO RELATED APPLICATIONS

This application is based on and claims the benefit of priority from Japanese Patent Application Serial No. 2012-122741 (filed on May 30, 2012), the contents of which are hereby incorporated by reference in their entirety.

TECHNICAL FIELD

The present invention relates to a game system for providing a video game such as an online game that uses game contents.

BACKGROUND

So-called online games have become popular, wherein a game server provides game data to clients via a network and the clients perform game functions based on the provided game data. In an online card game, which is a sort of online game, a player is provided with game contents such as character cards and items used in the game. An example of such a card game is disclosed in Japanese Patent Application Publication No. 2009-187143. Also, a method of selecting a game content to be provided to a player is disclosed in Japanese Patent Application Publication No. 2008-93165 (the "'165 Publication"). In the game disclosed in the '165 Publication, each game content is associated with a winning probability and one or more game contents to be provided to a player are selected based on the winning probability in response to an acquisition request (purchase request) for one or more game contents from the player.

Cards with low winning probabilities are sometimes called "rare cards." Many games are designed such that rare cards can be used to progress the games advantageously. Therefore, many players seek rare cards in the games. In many cases, players have to make a multiple of acquisition requests (or lottery requests) for game contents before obtaining rare cards with low winning probabilities.

In many on-line card games, an acquisition request for a game content can be made at the expense of in-game points. Therefore, as the more acquisition requests are made to acquire a rare card, the more costs such as in-game points are consumed before obtaining a desired rare card. Since a game content to be provided to a player is selected from a certain population based on winning probabilities, the number of acquisition requests required to obtain a rare card can be known based only on stochastic prediction by a player. The actual costs required does not necessarily agree with stochastic prediction (player's expectation). Rather, in many cases, the actual cost deviates from the expected value to some extent. Thus, where a game content to be provided to a player is selected from a certain population based on winning probabilities, players cannot make an accurate prediction of costs required to obtain a desired game content.

SUMMARY

To overcome these and other problems, one object of the present invention is to provide a game server that enables an accurate prediction of cost required to obtain a desired game content. Other objects of the present invention will be described in the entirety of this specification.

A server device according to an embodiment of the present invention is a server device for providing a game to be played using one or more game contents to a plurality of players via a network, each of the plurality of players being individually allocated a deck, the server device comprising: a won game content selecting unit configured to select, in response to a game content acquisition request from a terminal device of a first player of the plurality of players, one or more game contents as first won game contents from a limited plural number of game contents associated with a first deck allocated to the first player, an owned game content information storage unit configured to store the one or more first won game contents in association with first player identification information identifying the first player; and an updating unit configured to update the first deck for the first player by clearing the one or more first won game content from the first deck for the first player.

A method according to an embodiment of the present invention is a method using a computer for providing a game using game contents to a plurality of players via a network, each of the plurality of players being individually allocated a deck, the method comprising the steps of: selecting, in response to a game content acquisition request from a first player of the plurality of players, one or more game contents as first won game contents from a limited plural number of game contents contained in a first deck for the first player, the first deck being allocated to the first player, storing the one or more first won game contents in association with first player identification information identifying the first player; and updating the first deck for the first player by clearing the one or more first won game content from the first deck for the first player.

A server device according to an embodiment of the present invention is a server device for providing a game using a game content to a plurality of players via a network, the server device comprising: a won game content selecting unit configured to select one or more game contents as first won game contents from a plurality of different game contents contained in a first deck allocated to a first player of the plurality of players; a contained game content information management unit configured to store contained game content information including a current contained number and an aggregate contained number of each of the plurality of different game contents contained in the first deck, in association with first deck identification information identifying the first deck; an owned game content information storage unit configured to store the first won game contents in association with first player identification information; an updating unit configured to update the contained game content information, wherein the number of the game contents selected as the first won game contents by the won game content selecting unit is subtracted from the current contained number of the game content corresponding to the first won game contents; and an information providing unit configured to provide, to a terminal device of the first player, information indicating a current contained number and an aggregate contained number of each type of the game contents contained in the first deck.

Various embodiments of the present invention provides a server device that enables an accurate prediction of cost required to obtain a desired game content.

BRIEF DESCRIPTION OF THE DRAWINGS

FIG. 4 shows an example of deck identification information management table according to the embodiment of the present invention.

FIG. 5 shows an example of contained game content information management table according to the embodiment of the present invention.

FIG. 6 shows an example of owned game content management table according to the embodiment of the present invention.

FIG. 11 shows an example of deck identification information management table according to another embodiment of the present invention.

FIGS. 12a and 12b show examples of contained game content information management table according to another embodiment of the present invention.

FIG. 15 shows an example of deck identification information management table according to another embodiment of the present invention.

FIG. 16 shows an example of contained game content information management table according to another embodiment of the present invention.

DESCRIPTION OF EXAMPLE EMBODIMENTS

Figure 1:
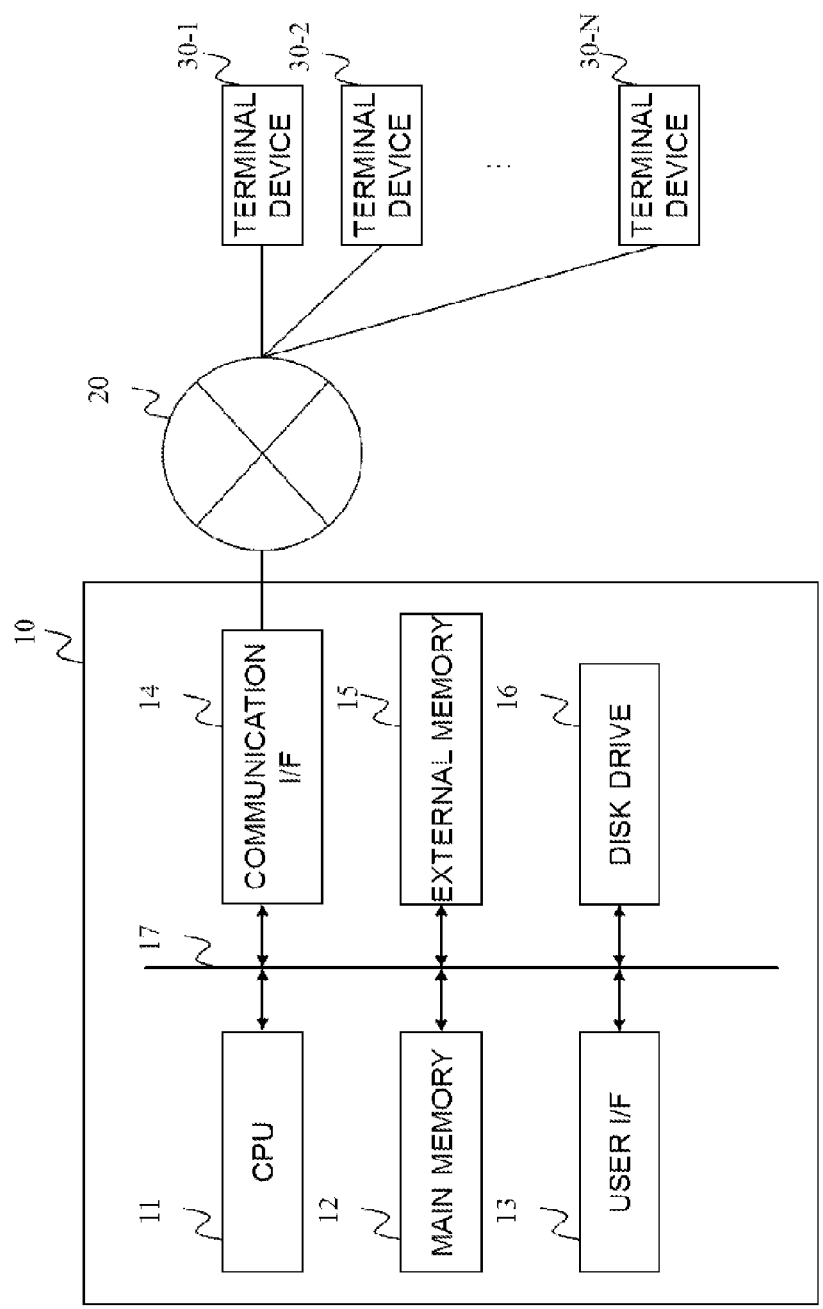
FIG. 1 is a block diagram schematically illustrating the architecture of a server device according to an embodiment of the present invention.

Various embodiments of the present invention will be described hereinafter with reference to the appended drawings. In the drawings, the same components are denoted by the same reference numerals.

FIG. 1 is a block diagram schematically illustrating a game system according to an embodiment of the present invention. As illustrated in FIG. 1, in the embodiment of the present invention, an online game server device 10 (hereinafter also referred to simply as the "server device 10") may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 is an example of a device implementing part or all of a game system according to an embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal devices 30 via the communication network 20.

The external memory 15 may be formed of, for example, a magnetic disk drive and store various programs such as a control program for controlling the progress of an online game. The external memory 15 may also store various data used in the game. The external memory may store, for example, a deck identification information management table, an owned game content management table, and a contained game content information management table that contains various data in accordance with the progression of the game (these tables will be described later). Also, these tables may be stored on a database server communicatably connected to the server device 10 and physically separate from the server device 10.

The disk drive 16 may read data stored in a storage medium such as a compact disc read only memory (CD-ROM), digital versatile disc read only memory (DVD-ROM), or DVD Recordable (DVD-R) disc, or write data to such a storage medium. For example, a game application and data such as game data stored in a storage medium may be read by the disk drive 16, and may be installed into the external memory 15.

In an embodiment, the server device 10 may be a web server for managing a web site including a plurality of hierarchical web pages and may be capable of providing the terminal devices 30 with game services. The terminal devices 30 may be provided with browser software that fetches and analyzes HTML data for rendering a web page to present the web page to a user (a player of the game) of the terminal devices 30. A game provided through a web page rendered by such browser software is sometimes called a browser game. The HTML data for rendering the web page may also be stored on the external memory 15. HTML data may comprise HTML documents written in markup languages such as HTML; the HTML documents can be associated with various images by using tags. Additionally, the HTML documents can include programs written in script languages such as ActionScript™ and JavaScript™

The external memory 15 may store game applications to be executed on execution environments of the terminal device 30 other than browser software. This game application may include game programs for performing game functions and various data such as image data to be referred to for executing the game programs. The game programs may be created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server device 10 may be received by the terminal device 30 through a communication I/F 34 in accordance with the control of CPU31; the received game programs may be sent to an external memory 35 and stored thereon. The application software may be launched in accordance with the player's operation on the terminal device 30 and may be executed on a platform implemented on the terminal device 30 such as NgCore™ or Android™. The server device 10 may provide the game applications executed on the terminal devices 30 with various data required for progression of the games. Additionally, the server device 10 can store various data sent from the terminal device 30 for each player, thereby managing the progression of the game for each player.

Thus, the server device 10 may manage the web site for providing game services and deliver web pages constituting the web site in response to a request from the terminal device 30, thereby progressing the game. Also, the server device 10 can progress a game by communicating various data to and from a game application performed on the terminal device 30 in place of, or in addition to, such a browser game. Whichever mode may be taken to provide the game, the server device 10 can store data required to progress the game for each identification identifying a player (described later). The games provided by the server device 10 may include desired games such as action games, roll playing games, interactive baseball games, and card games. The types of the games implemented by the web site or game applications of the server device 10 are not limited to those explicitly described herein.

In an embodiment, the terminal device 30 may be a desired information processing device capable of rendering, on a web browser, web pages of a game web site fetched from the server device 10; for example, the terminal device 30 may be a mobile phone, smart phone, game console, personal computer, touch pad, or electronic book reader, but is not limited thereto. In another embodiment, the terminal device 30 may be a desired information processing device including an application execution environment for executing a game application.

Figure 2:
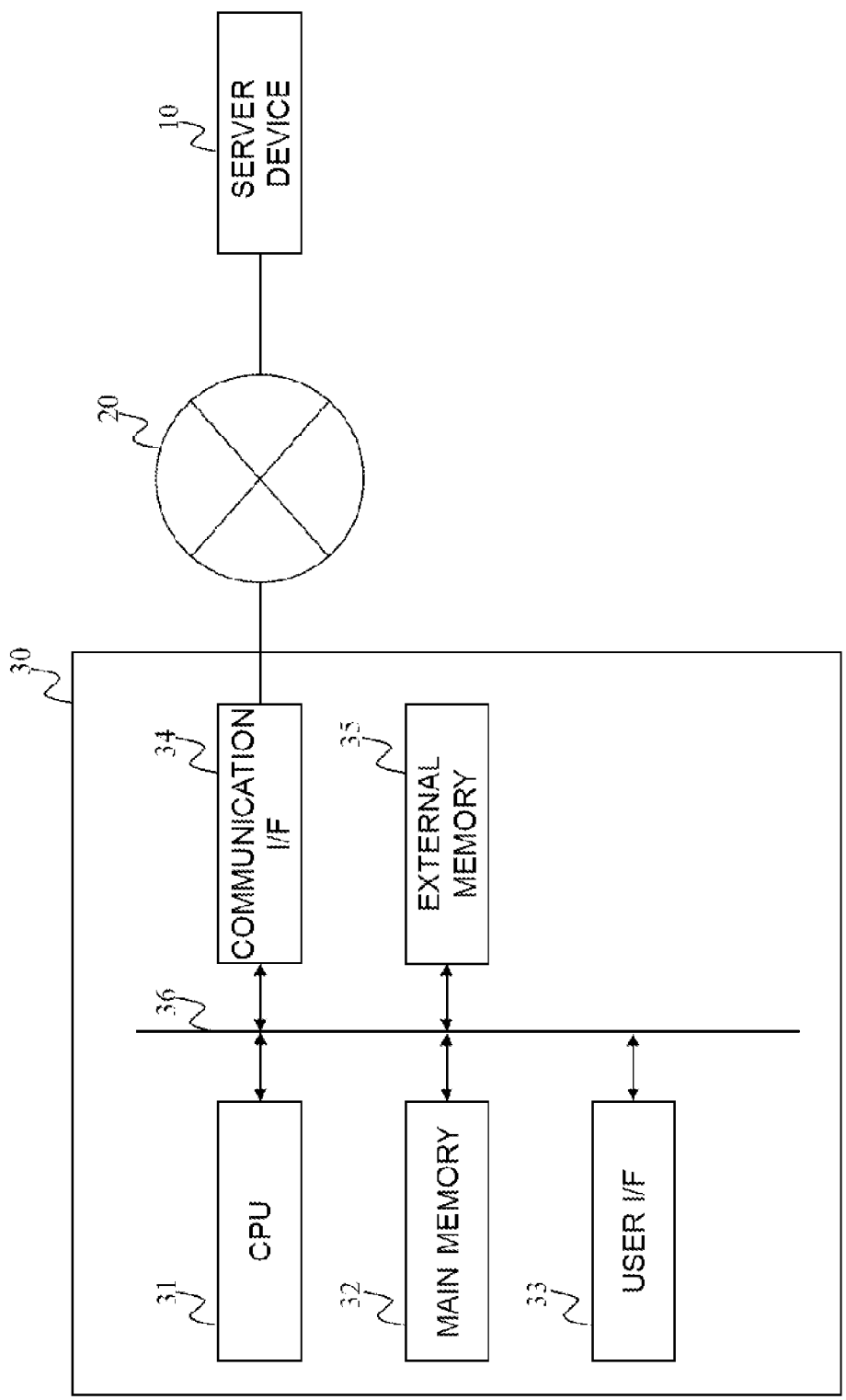
FIG. 2 is a block diagram schematically illustrating the architecture of a terminal device connected to the server device according to the embodiment of the present invention.

The architecture of the terminal device 30 will be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game application from the server device 10 via the communication I/F 34, the external memory 35 may store the received game application.

A terminal device 30 having such an architecture may include browser software for interpreting and rendering an HTML file (HTML data) for example; this browser software may enable the terminal device 30 to interpret the HTML data fetched from the server device 10 and render web pages corresponding to the received HTML data. Further, the terminal device 30 may include plug-in software (e.g., Flash Player distributed by Adobe Systems Incorporated) (FLASH is a trademark) embedded into browser software; therefore, the client device 30 can fetch from the server device 10 a SWF file embedded in HTML data and execute the SWF file by using the browser software and the plug-in software.

When a game is executed, for example, animation or an operation icon designated by the program may be displayed on a screen of the terminal device 30. The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™.

Figure 3:
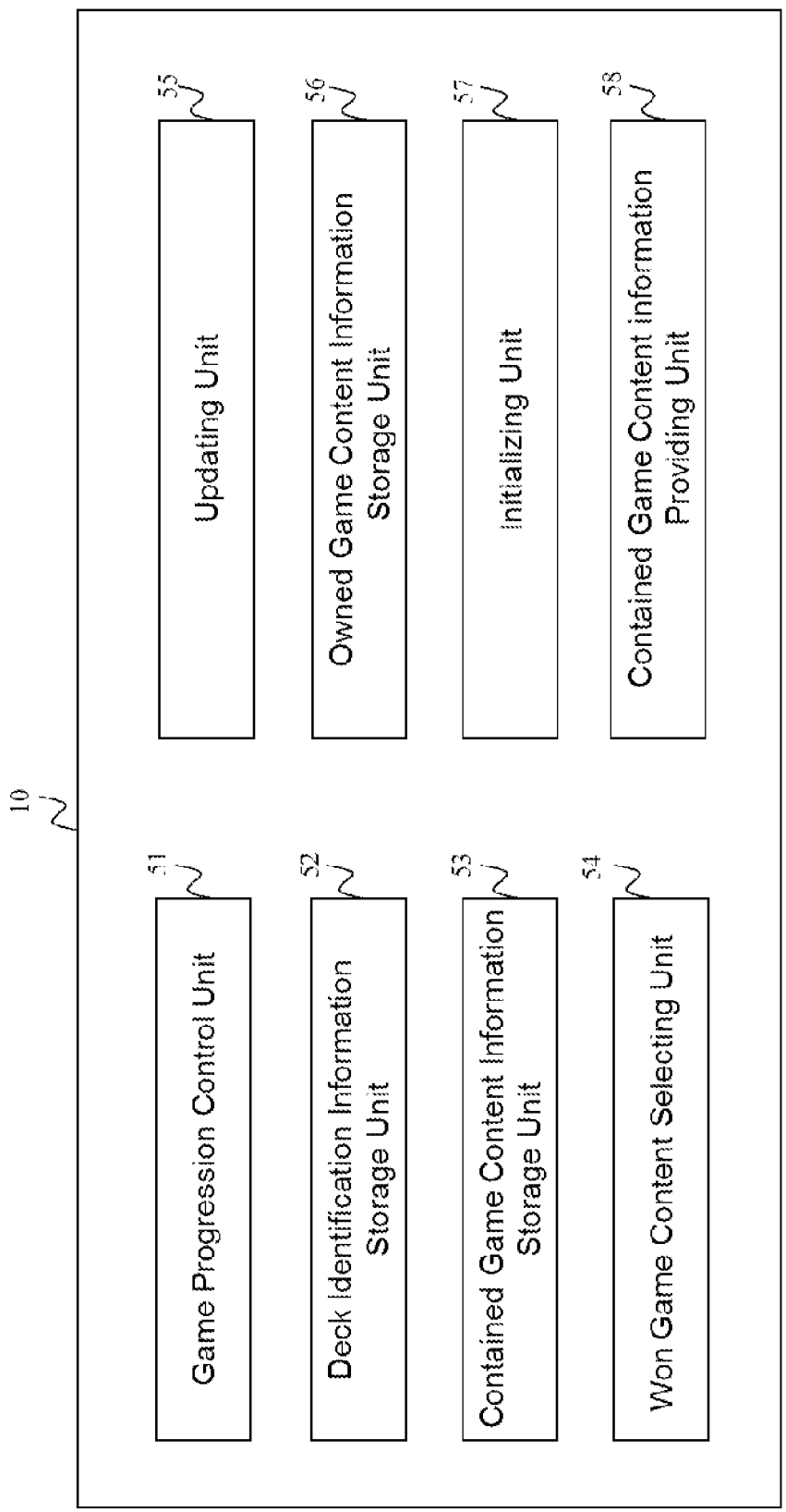
FIG. 3 is a block diagram illustrating the functionality of the server device according to the embodiment of the present invention.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, the server device 10 according to this embodiment may have a game progression control unit 51, a deck identification information storage unit 52, a contained game content information storage unit 53, a won game content selecting unit 54, an updating unit 55, an owned game content information storage unit 56, an initializing unit 57, and a contained game content information providing unit 58. The server device 10 may also include a charging unit configured to authenticate a player at start of the game and perform charging process in accordance with progression of the game. These functions may be implemented by the CPU 11 controlling the loading of a certain program onto a main memory 12 and performing operations based on the instructions in the program.

The game progression control unit 51 may send and receive various data required for the progression of the game to and from the terminal device 30 and manage such data for each player, thereby controlling the progression of the game for each player. For example, the game progression control unit 51 can sequentially display, on the terminal device 30, web pages constituting a web site for providing game services in response to a request from the terminal device 30. When a hyperlink on the displayed web page is selected by the player, the game progression control unit 51 may send new HTML data corresponding to the hyperlink to the terminal device 30. The terminal device 30 displays a web page based on the new HTML data. Thus, the game progression control unit 51 may control the game such that web pages stored on the server device 10 are sequentially provided to the terminal device 30 in accordance with the operation by the player; and the player can progress the game by operating the terminal device 30.

When the terminal device 30 executes the game application, the game progression control unit 51 can send various data used in the game to the game application. For example, when receiving from a game application on the terminal device 30 a control signal indicating that a certain mission has been fulfilled, the game progression control unit 51 may provide the game application with various parameters related to a mission subsequent to the fulfilled mission. The game application may load the data provided by the server device 10 and progress the game.

The terminal device 30 can appropriately send to the server device 10 various information on progression of the game such as information indicating various parameter values used in the game (information on earned game points and earned items) and information indicating a status (information specifying a fulfilled mission), through the function of browser software or the game application. The game progression control unit 51 may store, for each player, information on the progression of the game received from a plurality of terminal devices 30, thereby controlling the progression of the game for each player. Thus, when the player logs in the server device 10 using his own ID, the game may be resumed from the scene corresponding to the progression of the player (e.g., the scene where the game was interrupted) based on the information on the progression of the game associated with the player stored in the server device 10. As will be described later, the information required for the progression of the game may be managed by various functions of the server device 10 other than the game progression control unit 51.

Various game functions may be performed on the terminal device 30. The game functions performed on the terminal device 30 use various game contents such as electronic cards, items, and/or virtual currency used in the games. The term "game contents" may refer to electronic data used by players to progress the games and including, but not limited to, cards, items, characters, and avatars. In an embodiment of the present invention, the game contents may be obtained, owned, used, managed, exchanged, fused, reinforced, sold, discarded, and/or presented by players in the games in accordance with progression of the games. It should be noted that the use of the game contents is not limited to those explicitly described herein. In selling of a card in a game, a player may be paid in virtual currency used in the game, not in real currency, for the card sold. The game contents may have, for example, attribute information assigned thereto (e.g., "rarity," "level," "offensive power," "defensive power," and "the name of the game content") to be referred to in the progression of the game as required. At least part of these attribute information may be updated in accordance with the game. A player can progress the game using the game contents having updated attribute information. For example, in the card game, a player can use one or more his own cards to fulfill a mission or combat other players or non-player characters, thereby progressing the game. The Applicant provides various card games on Mobage™ platform.

Game contents used in the embodiments of the present invention may be managed in the server device 10 in the units of game content-containing decks (herein also referred to as simply as "decks"). Each player can obtain a game content contained in a deck allocated to the player via the terminal device 30, and progress the game by using the obtained game content. A deck may contain a limited number of game contents. Each player of the game may be individually allocated a deck. The game contents contained in decks may be different for each player; or decks containing common game contents may be allocated to the players.

The deck identification information storage unit 52 may store deck identification information that identifies a deck allocated to each player in association with player identification information that identifies the player. The deck identification information storage unit 52 is implemented by a deck identification information management table provided on, for example, an external memory 15 or an external database server. FIG. 4 shows an example of the deck identification information management table. As shown, the deck identification information management table may store deck identification information that identifies decks allocated to players in association with player identification information that identifies players. In the example shown in FIG. 4, deck identification information "D000001" is stored in association with player identification information "000001."

"Player identification information", as used herein, may consist of an identification code that identifies a player of a game and may be composed of, for example, a six-digit number. The code system of the player identification information is not limited to those explicitly described herein and may be configured desirably. For example, the player identification information may include an alphabetic character. Ordinarily, the player identification information may be assigned to a player, for example, when the player first logs in or sign up for a game, and may be reused for later logins of the player. Thus, the player identification information may be unique to a player and identifies the player in a game. "Deck identification information" may be an identification code that identifies a deck used in the game, and may consist of, for example, an alphabetic character and a six-digit number. The code system of the deck identification information is not limited to those explicitly described herein and may be configured desirably.

Information on game contents contained in each deck (hereinafter also referred to as "contained game content information") may be stored in the contained game content information storage unit 53. The contained game content information storage unit 53 is implemented by a contained game content information management table provided on, for example, an external memory 15 or an external database server. FIG. 5 shows an example of the contained game content information management table. As shown, the contained game content information management table may store, in association with deck identification information, contained game content information on one or more game contents contained in the deck identified by the deck identification information. The contained game content information may include game content identification information that identifies game contents (or types of game contents) contained in the deck and "rarity value," "aggregate contained number," and "current contained number" of the game contents.

"Game content identification information" consists of an identification code that identifies a game content (or the type of a game content) owned by a player and is composed of, for example, an alphabetic character and a six-digit number. The code system of the game content identification information is not limited to those explicitly described herein and may be configured desirably.

The "rarity value" of a game content is an indicator that may indicate how frequently the game content can be obtained. This indicator may have a value ranging from "1" to "4" in the example shown in FIG. 5. In this example, it is supposed that a game content having a lower rarity value can be more frequently obtained by players, while a game content having a higher rarity value can be obtained with less frequency. The rarity value may also be set conversely such that a game content having a higher rarity value can be obtained more frequently.

Various techniques can be used to reduce the frequency that a game content having a higher rarity value can be obtained. For example, in the example shown in FIG. 5, a smaller number of game contents are contained in the deck as the rarity value of the game contents is higher. In this embodiment, if game contents to be provided to players are randomly selected from the game contents contained in the deck, game contents having a higher rarity value is less frequently selected. Also, in selecting a game content to be provided to a player from the game contents contained in the deck, winning probabilities may be weighted such that game contents having a higher rarity value is assigned a lower probability of being selected. In this embodiment, game contents having a higher rarity value are less likely to be selected. Even if rarity values of game contents are not assigned, low winning probabilities may be assigned to game contents that provide special effects in the game or game contents having a same or different type of game content attached thereto (also called a "prize-including" game content in actual games), such that these game contents are less likely to be selected.

The "aggregate contained number" (also referred to as "initial contained number") of a game content in FIG. 5 represents the number of the game contents contained in a deck in an initialized state. As described above, the "aggregate contained number" of each game content may be determined such that, as the rarity value of the game content is higher, a smaller number of the game contents are contained in the deck. In the example shown in FIG. 5, the aggregate contained numbers are set to "50" for both the game content identified by the game content identification information "M000001" (hereinafter also referred to as "game content 1") and the game content identified by the game content identification information "M000005" (game content 5), both having the lowest rarity value "1." In contrast, the aggregate contained number is set to "1" for the game content identified by the game content identification information "M000004" (game content 4) having the highest rarity value "4." Accordingly, if game contents are randomly selected from game contents contained in this deck, the probability that game content 4 is selected is one fiftieth of the probability that game content 1 is selected (the same applies to comparison with game content 5).

The "current contained number" of a game content in FIG. 5 represents the number of the game contents remaining in the deck after won game contents (described later) are provided to a player. As will be described later, game contents selected as won game contents from game contents contained in the deck identified by the deck identification information "D000001" (hereinafter also referred to as "deck 1") may be provided to the player identified by the player identification information "000001" (hereinafter also referred to as "player 1"). The "current contained number" of the game content is calculated by subtracting the number of the game contents provided to the player from the "aggregate contained number" of the game content. The number of remaining game contents in the deck thus calculated is stored in a region of "current contained number" in the contained game content information management table.

The "name" of a game content in FIG. 5 represents a name assigned to the game content. "Name" is an example of game content attribute information representing an attribute of a game content. Although omitted from FIG. 5, various game content attribute information other than "name" may be stored in the contained game content information management table. Game content attribute information may include, for example, images of game contents, attribute values assigned to the game contents such as offensive power and defensive power, and experience points obtained by using the game contents in the game. These various information may be stored in the contained game content information management table.

FIG. 5 shows contained game content information stored in association with deck identification information "D000001." Likewise, other deck identification information may be associated with contained game content information. The types of the contained game content information associated with other decks may be either the same as or different from that of deck 1.

The won game content selecting unit 54 selects, in response to a game content acquisition request from a player, one or more won game contents from the game contents contained in the deck allocated to the player in accordance with a predetermined lottery algorithm. For example, when the server device 10 receives from the terminal device 30 of player 1 a game content acquisition request inputted into the terminal device 30 by player 1, the deck identification information management table shown in FIG. 4 may be used to specify the deck identification number "D000001" associated with the player identification number "000001" of player 1; and then a won game content may be selected from the game contents contained in the deck identified by the deck identification number "D000001". In the example shown in FIG. 4, deck 1 is allocated exclusively to player 1. Therefore, even if a game content acquisition request is received from a player other than player 1, no won game content is selected from the game contents contained in deck 1.

In an embodiment, a won game content may be randomly selected from the game contents contained in the deck by using, for example, pseudorandom numbers. In the example embodiment shown in FIG. 5, the total number of contained game contents is 100 (there are 32 game contents 1, 21 game contents 2, 9 game contents 3, 1 game content 4, 29 game contents 5, and 8 game contents 6; the total number of these game contents is 100). Therefore, the winning probability of each game content is one hundredth. In this case, game contents in a larger current contained number are more likely to be selected as won game contents. For example, game content 1 and game content 5, having a low rarity value, are more likely to be selected due to large current contained numbers; conversely, game content 4, having a high rarity value, are less likely to be selected due to a small current contained number. Thus, in the example shown in FIG. 5, game contents having a higher rarity value are in a smaller current contained number; therefore, game contents having a higher rarity value are less likely to be selected as won game contents. An example of game contents having a high rarity value as game content 4 is a "rare card."

In another embodiment, winning probabilities may be assigned in accordance with rarity values of the game contents such that the probability of being selected is lower for a higher rarity value. The won game content selecting unit 54 selects won game contents based on the assigned winning probabilities. Thus, game contents having a higher rarity value are assigned a lower probability of being selected; therefore, game contents having a higher rarity value are less likely to be selected as won game contents.

In response to a game content acquisition request for one game content from a player, the won game content selecting unit 54 may either select one won game content or select, simultaneously or sequentially, a desired plural number of won game contents. To implement such a function, in an embodiment of the present invention, a game content acquisition request may include the number of game contents wanted by the player. In this case, the number of wanted game contents may be set to a desired natural number equal to or smaller than the total of current contained numbers of all the game contents contained in the deck. In an embodiment, a web page for generating a game content acquisition request (see FIG. 8) may contain an input area for inputting the number of wanted game contents. A player can input a desired number into the input area through operation of the terminal device 30. The game content acquisition request may include the number inputted in the input area as the number of wanted game contents. In another embodiment, acquisition of all the game contents contained in the deck may be requested, if selected by the player. In this case, the server device 10 may send to the terminal device 30 a web page for generating and sending an all-game content acquisition request for acquiring all the game contents contained in the deck. The web page may contain an operation button for generating an all-game content acquisition request and when the player operates the terminal device 30 to select the operation button, a game content acquisition request including an all-game content acquisition request is generated.

The updating unit 55 may clear the deck of won game contents selected from the game contents in the deck by the won game content selecting unit 54. For example, in the example shown in FIG. 5, when one game content 1 is selected by the won game content selecting unit 54, the "current contained number" stored in association with "M000001" is reduced from "32" to "31." Thus, one game content 1 may be cleared from the deck. As described above, clearing a won game content from the deck herein may involve reducing the current contained number of the won game content. When a plurality of won game contents are selected, the current contained number of the won game content in the deck may be reduced by the number of selected game contents. For example, when three game contents 1 are selected as won game contents by the won game content selecting unit 54, the "current contained number" stored in association with "M000001" may be reduced from "32" to "29." Thus, the updating unit 55 may clear the deck of the won game contents selected by the won game content selecting unit 54, so as to update at least part of the contained game content information associated with the deck.

The owned game content information storage unit 56 may store one or more game contents owned by players in the game, in association with player identification information that identifies the players. For example, the owned game content information storage unit 56 may be implemented by an owned game content management table provided on, for example, an external memory 15 or an external database server. FIG. 6 shows an example of the owned game content management table. As shown, the owned game content management table may store game content identification information that identifies five game contents owned by each player and the owned number of each of the game contents in association with player identification information that identifies the player. In FIG. 6, "N/A" represents that no game content is owned.

When, in response to a game content acquisition request from a player, the won game content selecting unit 54 selects a won game content, the owned game content information storage unit 56 stores the won game content as an game content owned by the player. For example, in the example shown in FIG. 6, when game content 1 is selected as a won game content in response to a game content acquisition request from player 1, the number of game contents 1 associated with the player identification information "000001" in the owned game content management table is updated from "8" to "9." Thus, when the same game contents as one or more game contents already owned are selected as won game contents, the owned number of the game content is increased by the number of game contents selected as won game contents. For example, when one game content 1 is selected as a won game content, the owned number of game content 1 in the owned game content management table is increased by "1." Further, when three game contents 1 are selected as won game contents, the owned number of game content 1 in the owned game content management table is increased by "3." When a game content not owned by player 1 is selected as a won game content, game content identification information that identifies the won game content is stored in association with the player identification information "000001" of player 1. For example, in the example shown in FIG. 6, when game content 4 is selected as a won game content in response to a game content acquisition request from player 1, the region of "owned item 5" associated with the player identification information "000001" may store the game content identification information "M000004" that identifies game content 4 and the owned number thereof "1."

The owned game content management table may also be updated in accordance with progression of the game in cases other than the case where a won game content is selected by the won game content selecting unit 54. For example, when the player acquires a game content such as a weapon item in a game, the game content is stored in the owned game content management table in association with the player identification information of the player who has acquired the game content. When the player newly acquires a game content such as a weapon item, the owned game content information storage unit 56 causes the owned game content management table to store the game content identification information that identifies the newly acquired game content, in association with player identification information of the player who has acquired the game content. Further, when a player exchanges game contents with another player, the owned game content management table is updated so as to reflect the exchange.

The initializing unit 57 may perform an initializing process for initializing the deck when a predetermined initializing condition is satisfied. The initializing conditions may include, for example, the following: (a) a game content having the highest rarity value in the deck is selected as a won game content (initializing condition (a)), (b) the total of current contained numbers of all the game contents contained in the deck becomes smaller than a predetermined number (initializing condition (b)), (c) a predetermined amount of time elapses from predetermined points of time such as a point when the player started using the deck, a point when the player signed up for the game, or a fixed point (e.g., 0 o'clock) (initializing condition (c)), (d) the server device 10 received game content acquisition requests a predetermined times from the player to which the deck is allocated (initializing condition (d)), and (e) a predetermined number of won game contents are selected (initializing condition (e)). The initializing conditions applicable to the present invention are not limited to the above examples.

When any of these initializing conditions is satisfied, the initializing unit 57 initializes the deck. Initializing the deck involves setting or updating the deck such that the current contained numbers of the game contents contained in the deck are equal to the respective aggregate contained numbers of the game contents. As described above, the deck in the embodiments of the present invention is configured such that, when won game contents are selected in response to a game content acquisition request from a player, the won game contents are cleared from the deck; and simultaneously, the current contained number of the game content is reduced by the number corresponding to the number of the won game contents. Accordingly, the deck may be initialized by replenishing the deck, which has been cleared of the won game contents, with the cleared game contents. The deck may be initialized by various methods. Particularly, the initialization of the deck in the present invention is not limited to replenishment of the deck with cleared won game contents. For example, the initializing unit 57 may replenish the deck with game contents having a low rarity value instead of game contents having the highest rarity value (e.g., game contents 4). Thus, the number of distributed game contents having the highest rarity value can be restricted. In an embodiment of the present invention, when any of the initializing conditions (a) to (e) is satisfied, a web page for generating and submitting an initialization request is sent to the terminal device 30; and when an initialization request generated based on the operation of the web page by the player is received, the deck may be initialized.

When a game content having the highest rarity value in the deck is selected as a won game content as stated in the initializing condition (a), the possibility of acquiring a card having a further higher rarity value from the deck is significantly low (in the example shown in FIG. 5, when a game content 4 is selected, the deck becomes free of game contents 4; and there is no possibility of acquiring an additional game content 4). Therefore, the deck may be initialized in such a case. The initialized deck contains the maximum containable number of game contents having a high rarity value. The initializing process increases the probability of selecting game contents having a high rarity value as compared to that before the initializing process. Thus, the player may be continuously attracted even after game contents having a high rarity value is selected.

Further, when any of the initializing conditions (b) to (e) is satisfied, many game contents have already been cleared from the deck, and game contents may unevenly remain in the deck. Therefore, the initializing unit 57 initializes the deck when any of the initializing conditions (b) to (e) is satisfied in the deck. This can solve the unevenness of the game contents contained in the deck.

The initializing unit 57 may allocate an initialized deck to a player who plays the game for the first time. As described above, the initialization of a deck may cause the current contained numbers of the game contents contained in the deck to be equal to the respective aggregate contained numbers of the game contents. For example, the server device 10 can store a plurality of types of decks, of which one contains different game contents than another. The initializing unit 57 may randomly allocate the plurality of types of deck to players. Further, the initializing unit 57 can put a deck that is either the same as or different from a deck being used into a used state, in addition to the deck being used When an additional deck is put into a used state for a player, the won game content selecting unit 54 selects won game contents from the game contents contained in the originally used deck or in the added deck. Thus, by adding a deck to another deck being used, the total number of game contents that can be selected by the won game content selecting unit 54 can be increased. Additionally, by adjusting the total number of the game contents contained in the deck to be added, the probability that game contents having a high rarity value is selected can be kept constant.

Figure 10:
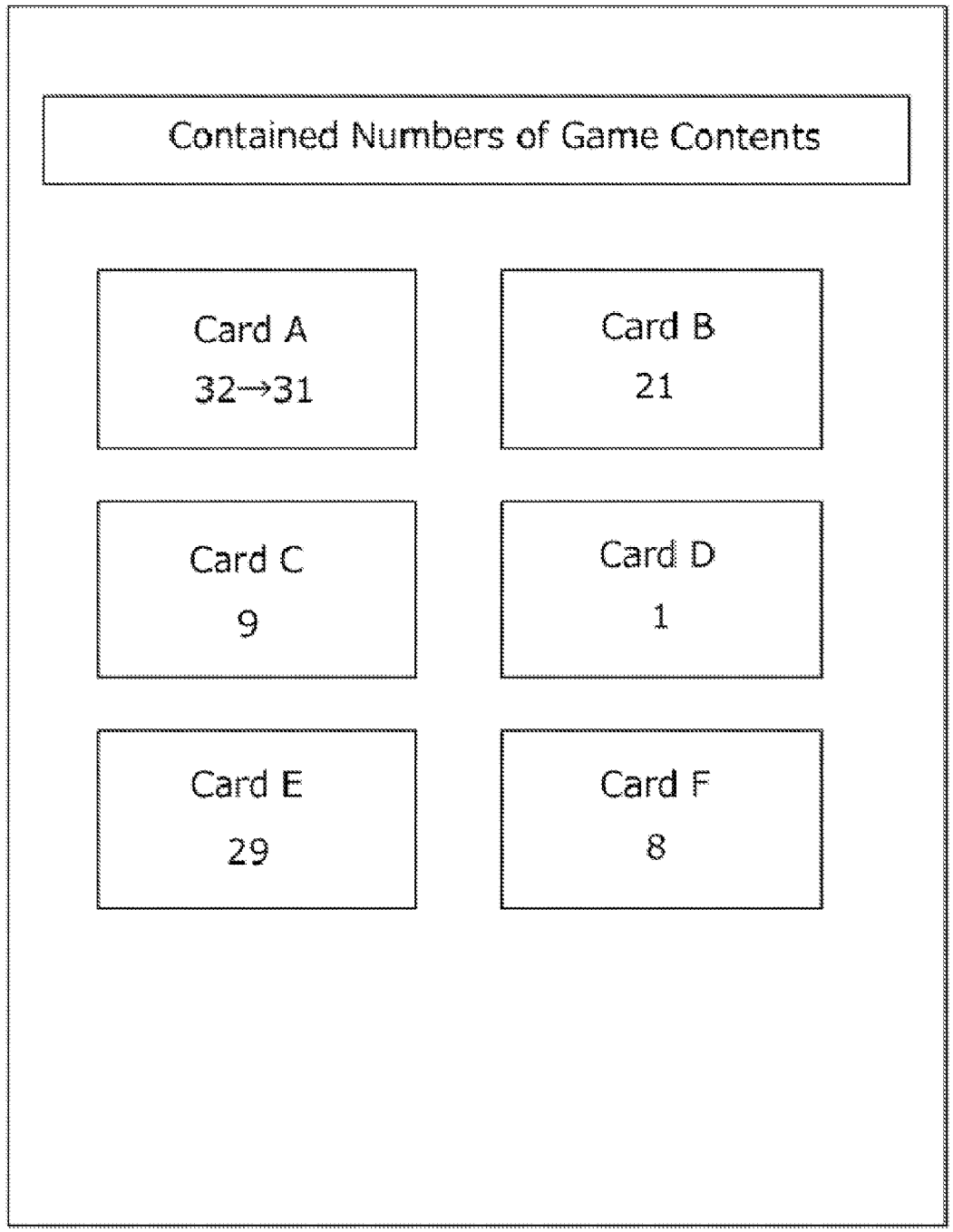
FIG. 10 shows an example of a display screen containing an updated contained game content information according to the embodiment of the present invention.

The contained game content information providing unit 58 may provide at least part of contained game content information stored in the deck identification information storage unit 52 to the terminal device 30 of the player. For example, the contained game content information providing unit 58 may generate a web page including part or all of "rarity value," "name," "aggregate contained number," and "current contained number" of game contents stored in the contained game content information management table, and provide the generated web page to the terminal device 30 for display on the terminal device 30. FIG. 10 shows an example of such display, which will be described later.

Figure 7:
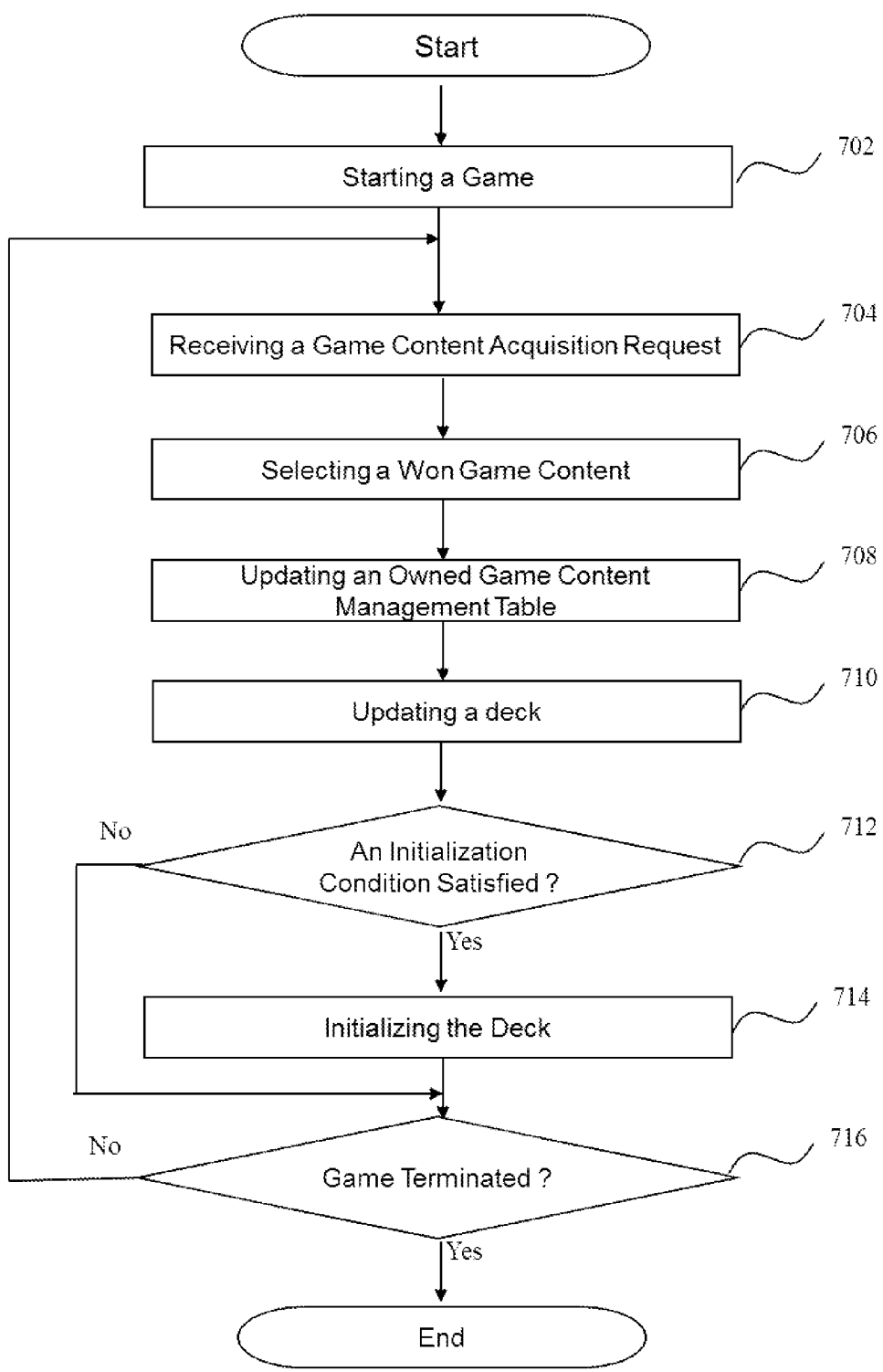
FIG. 7 is a flow diagram showing a process of selecting a won game content according to the embodiment of the present invention.

Next, an example of process of selecting won game contents in an embodiment of the present invention will be described below with reference to FIG. 7. FIG. 7 is a flow diagram schematically showing a process from the start of a game provided by the server device 10 until the deck has been updated in accordance with the selection of won game contents and the deck is initialized as required. The following description is based on the case where won game contents are selected from the game contents contained in deck 1 in accordance with a game content acquisition request from player 1.

Figure 8:
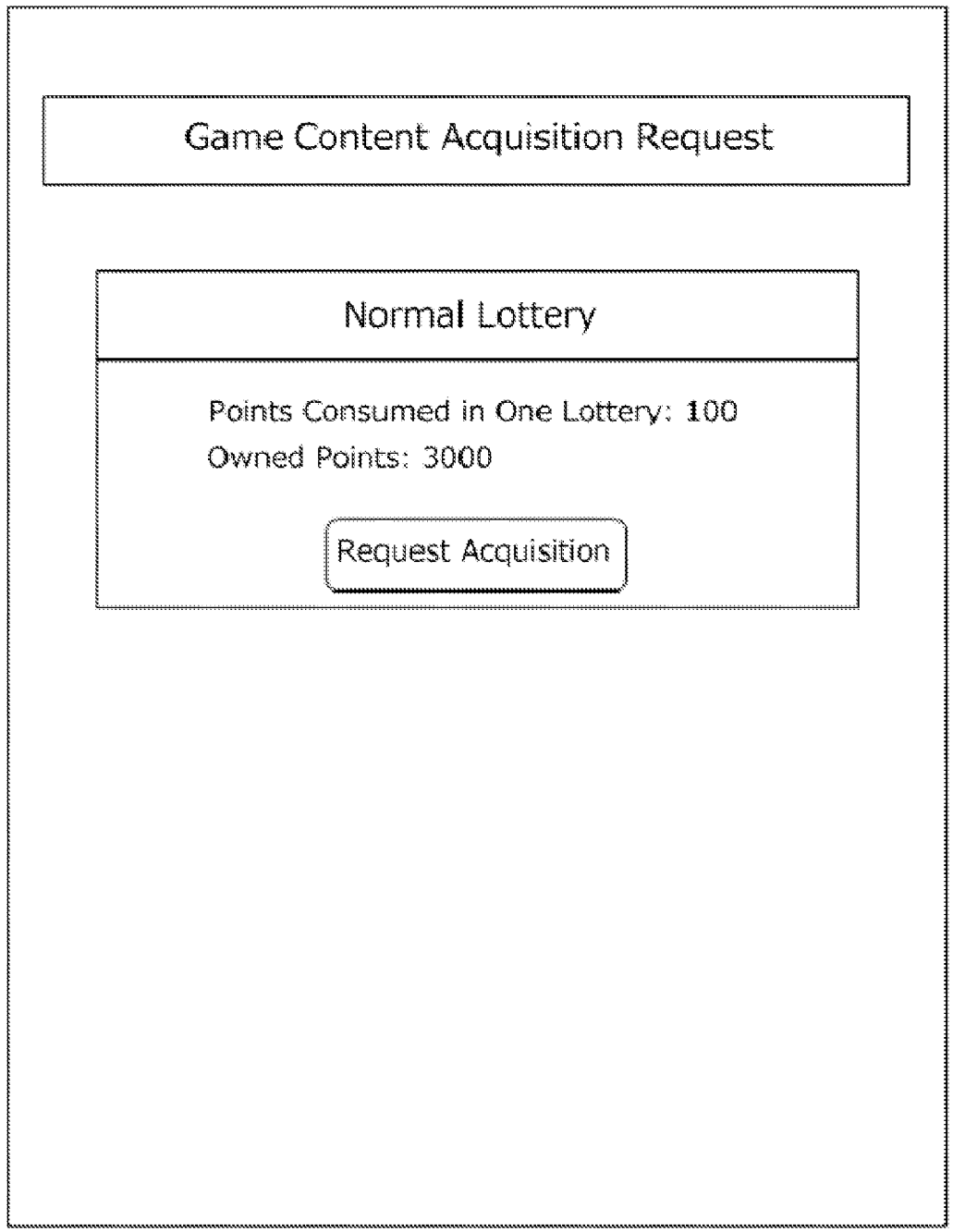
FIG. 8 shows an example of a display screen for prompting a player to generate a lottery request according to the embodiment of the present invention.

First, when the game is started in step 702, the player operates a terminal device 30 to access the server device 10 and acquires a desired web page from among a plurality of web pages constituting the game site. When the player selects a link to a web page for submitting a game content acquisition request to acquire a game content, for example, a display screen as shown in FIG. 8 is displayed on the terminal device 30. FIG. 8 shows an example of the display screen for prompting the player of the game to generate a game content acquisition request and send it to the server device 10. The terminal device 30 may acquire from the server device 10 HTML data corresponding to the web page for submitting a game content acquisition request, from among the web pages constituting the game site, and parse the HTML data. The terminal device 30 may thereby display a game content acquisition request screen shown in FIG. 8.

Figure 9:
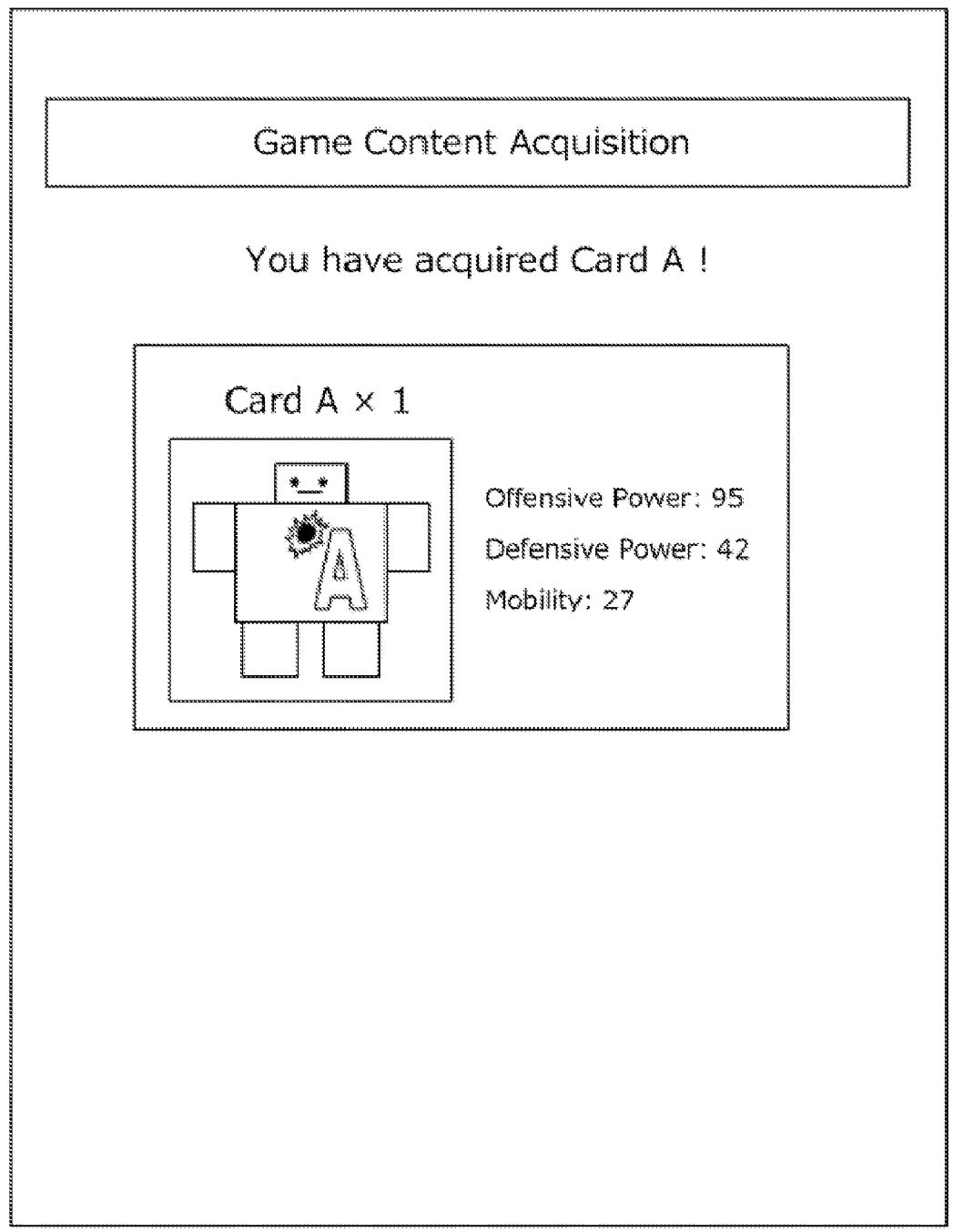
FIG. 9 shows an example of a display screen containing a won game content according to the embodiment of the present invention.

When the player operates the terminal device 30 to select an operation button captioned "Request Acquisition" in the game content acquisition request screen, the terminal device 30 generates a game content acquisition request and sends it to the server device 10. The game content acquisition request may include, for example, player identification information of player 1. Subsequently, in step 704, the server device 10 receives a game content acquisition request sent from the terminal device 30 of player 1. Next, in step 706, the won game content selecting unit 54 refers to the deck identification information management table in accordance with the received game content acquisition request to specify deck 1 allocated to player 1. A won game content is selected from among the game contents contained in deck 1 in accordance with the above described lottery algorithm. For example, when one game content 1 is selected as a won game content, a web page corresponding to the display screen of a won game content shown in FIG. 9 is generated, and the generated web page is sent to the terminal device 30 of player 1. The terminal device 30 of player 1 may analyze the received web page and display a display screen containing the won game content as shown in FIG. 9. Player 1 may see the display screen shown in FIG. 9 to confirm which game content has been selected as a won game content by lottery.

The server device 10 may store game points earned in the game by players and points that can be used in a plurality of games purchased from a game provider, in association with player identification information of the players. The server device 10 may update points such as game points stored in association with player identification information of player 1 based on game content acquisition request received from player 1. For example, the example shown in FIG. 8 represents that one game content acquisition request consumes 100 game points. When a game content acquisition request generated from the web page shown in FIG. 8 is received, the game points owned by player 1 may be reduced by 100 points.

Next, in step 708, game content 1 selected as won game content may be added to the game contents owned by player 1. More specifically, the owned game content information storage unit 56 updates the owned number for player 1 stored in the owned game content management table shown in FIG.

6 such that it increases by "1." As shown in FIG. 6, when player 1 owns eight game contents 1 before sending the game content acquisition request, the owned game content management table is updated such that the owned number of the game contents 1 becomes nine.

Next, in step 710, game contents 1 selected by the won game content selecting unit 54 may be cleared from deck 1 by the updating unit 55. When one game content 1 is selected by the won game content selecting unit 54, the updating unit 55 decreases the "current contained number" of game content 1 from "32" to "31," the "current contained number" being stored in the contained game content information management table in association with deck 1 and the game content identification information "M000001" of game content 1.

The contained game content information providing unit 58 may generate a web page including contained game content information stored in the updated contained game content information management table, and send the generated web page to the terminal device 30 of player 1. FIG. 10 shows an example of a display screen on the terminal device 30 corresponding to the web page including the updated contained game content information. As shown, the display screen shown in FIG. 10 contains the names and the current contained numbers of game contents in association with each other, among updated contained game content information of the game contents. In the display screen, game content 1 is represented by the name "Card A," along with the current contained number "32" before the update and the current contained number "31" after the update, in association with each other. Game contents other than game content 1 are represented by the names such as "Card B," along with the current contained numbers associated therewith. This web page may include the aggregate contained numbers in addition to the current contained numbers; the current contained numbers and the aggregate contained numbers may be displayed along in the display screen of FIG. 10. Thus, the current contained number and the aggregate contained number may be displayed in association with each other, so as to understandably present to the player what proportion of game contents among all the game contents contained in the deck have already been selected as won game contents (or cleared from the deck).

Next, in step 712, it is determined whether any of the initializing conditions stored on the server device 10 has been satisfied. Concrete examples of the initializing conditions have been described above. When none of the initializing conditions is satisfied, the process proceeds to step 716. In contrast, when any of these initializing conditions is satisfied, the process proceeds to step 714, where the initializing unit 57 initializes deck 1. For example, deck 1 may be initialized by updating the contained game content information such that the current contained numbers of game contents 1 to 6 are equal to respective aggregate contained numbers. In step 714, when any of the above initializing conditions is satisfied, a web page for generating and submitting an initialization request is sent to the terminal device 30; and when an initialization request generated based on the operation of the web page by the player is received from the terminal device 30, the deck 1 may be initialized.

Next, in step 716, if player 1 does not terminate the game, the process returns to step 704, and waits until another game content acquisition request is received from the terminal device 30 of player 1. When another game content acquisition request is received, the above processes 706 to 716 are performed again. If player 1 terminates the game, the game is terminated with respect to player 1.

As described above, in an embodiment of the present invention, each player is individually allocated a deck that can contain a limited number of game contents. A won game content may be selected from game contents contained in the deck allocated to the player based on a game content acquisition request from each player. The won game contents selected may be provided to the player and is cleared from the deck allocated to the player. Accordingly, each player sequentially acquires won game contents from a predetermined limited number of game contents; therefore, the player can grasp the types and the number of game contents remaining in his own deck by, for example, referring to the history of won game contents heretofore acquired. For example, if the player has acquired a number of game contents having a low rarity, it is understood that the deck contains a large proportion of game contents having a high rarity. Further, as shown in FIG. 10, the current contained numbers of game contents may be displayed on the terminal device of the player, thereby to directly inform the player of the type and the number of the game contents remaining in the deck.

Thus, each player may be individually allocated a deck that can contain a limited number of game contents, and a game contents provided to the player may be cleared from the deck, such that the player can grasp the types and the number of game contents remaining in the deck. Accordingly, the player can accurately expect the number of times of game content acquisition requests required to acquire a desired game content remaining in the deck such as a game content having a high rarity. Further, based on the expected number of times of game content acquisition request, the player can accurately expect the costs, such as consumed points, that increase with the number of times of game content acquisition requests. For example, as shown in the contained game content information management table in FIG. 5, the deck contains a total of a hundred game contents, of which only one is game content 4 having the highest rarity value. It is understood that, in this case, the game content having the highest rarity value can be acquired by a maximum of a hundred times of game content acquisition requests.

Next, a server device according to another embodiment of the present invention will be described with reference to FIGS. 11 and 13. In the embodiment, each player may be allocated a plurality of different decks. In the embodiment, the deck identification information management table shown in FIG. 4 is replaced with a deck identification information management table shown in FIG. 11; and the contained game content information management table shown in FIG. 5 is replaced with a contained game content information management table shown in FIG. 12. Except the deck identification information management table and the contained game content information management table, the server device according to this embodiment is configured in substantially the same manner as in the embodiment shown in FIGS. 1 to 10; and except the processing using these tables, the server device according to this embodiment performs substantially the same processing as in the embodiment shown in FIGS. 1 to 10. Therefore, detailed descriptions shared with the embodiment shown in FIGS. 1 to 10 will be omitted.

FIG. 11 shows an example of a deck identification information management table provided in the server device 10 according to this embodiment or a database communicatively connected to the server device 10; and FIG. 12 shows an example of a contained game content information management table provided in the server device 10 according to this embodiment or a database communicatively connected to the server device 10. FIG. 13 is a flow diagram schematically showing a process provided by the server device according to this embodiment.

As shown in FIG. 11, the deck identification information management table according to this embodiment may store deck identification information that identifies one or more decks allocated to each player in association with player identification information that identifies the player. For example, in the deck identification information management table shown in FIG. 11, player identification information "000001" is associated with two decks identified by deck identification information "D000001-1" and "D000001-2." For example, the deck identified by the deck identification information "D000001-2" (deck 1-2) is configured to have a larger aggregate contained number of a game content having a high rarity than the deck identified by the deck identification information "D000001-1" (deck 1-1). For example, in deck 1-2 shown in FIG. 12b, the aggregate contained number of game content 4 having the highest rarity is ten. Accordingly, when deck 1-2 is used to select a won game content, game content 4 is ten times as likely to be selected as with deck 1-1, in which the aggregate contained number of game content 4 is one (see FIG. 12a). The expected rarity value of the game contents contained in deck 1-2 may be either the same as or different from the rarity value of the game contents contained in deck 1-1. As described above with reference to FIG. 12, the expected rarity value is higher when deck 1-2 is used than when deck 1-1 is used (i.e., deck 1-2 contains a larger proportion of game contents having a high rarity value). Alternatively, game contents to be contained in deck 1-2 may be determined such that the expected rarity values for deck 1-1 and deck 1-2 are equal.

Figure 13:
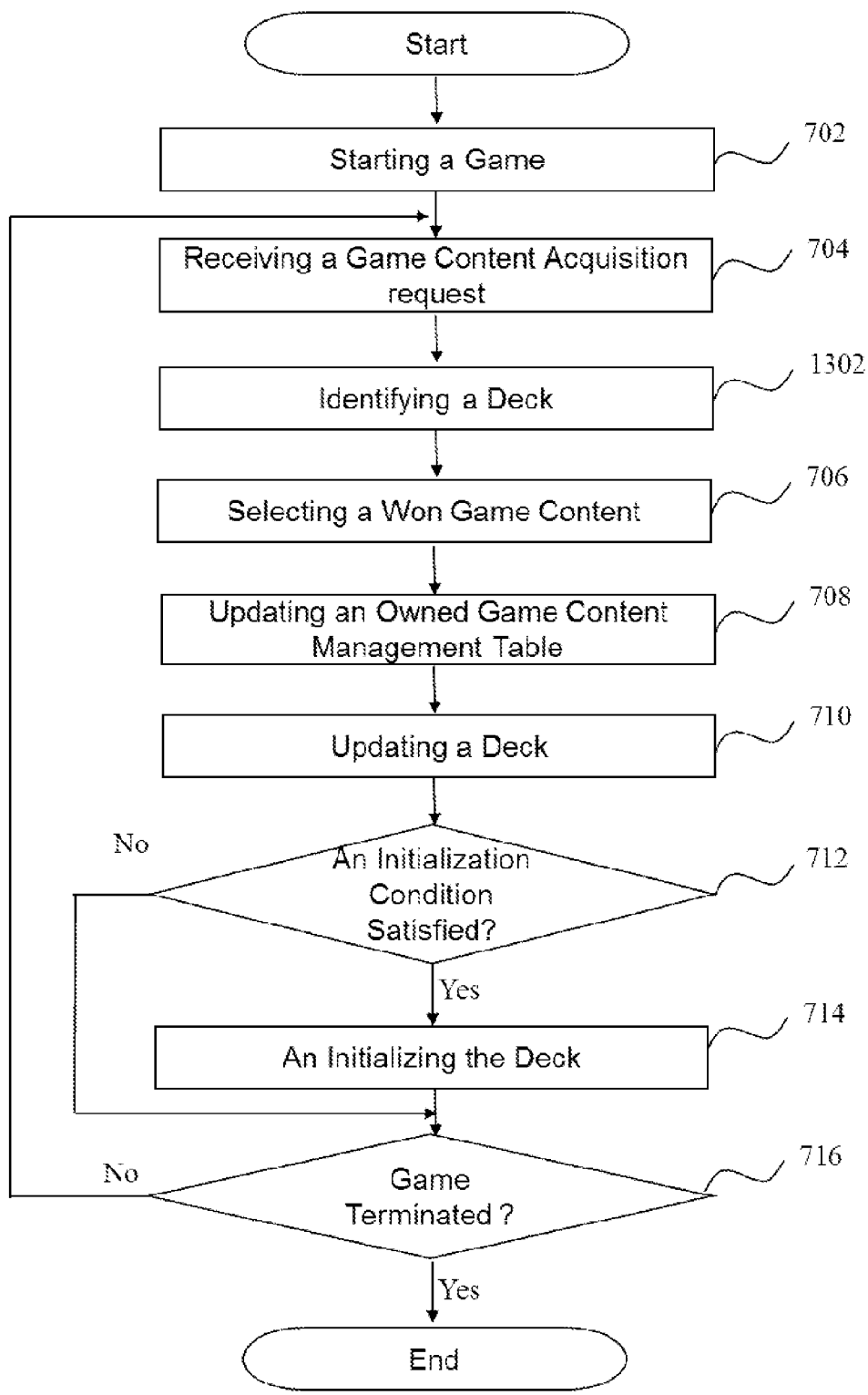
FIG. 13 is a flow diagram showing a process of selecting a won game content according to another embodiment of the present invention.
Figure 14:
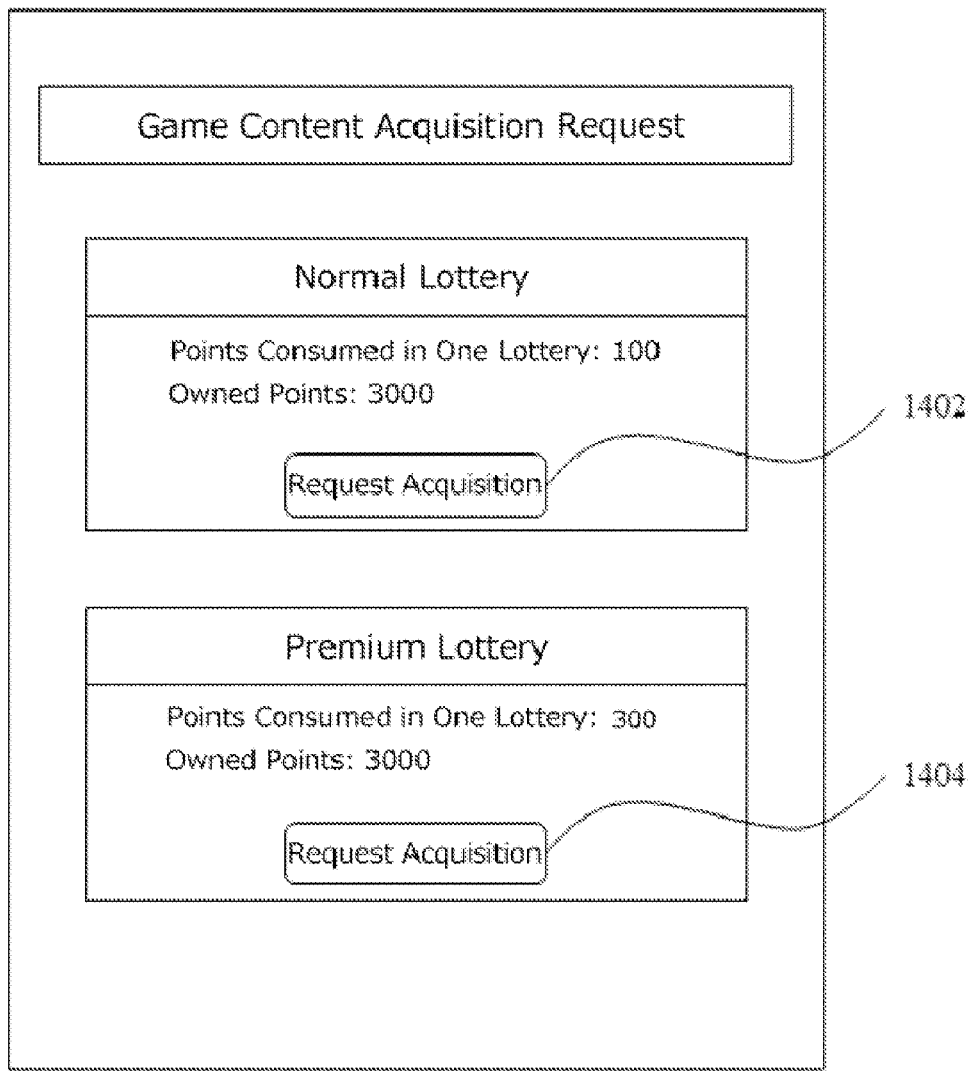
FIG. 14 shows an example of a display screen for prompting a player to generate a lottery request according to another embodiment of the present invention.

In accordance with the flow diagram shown in FIG. 13, player 1 starts the game in step 702, when the server device 10 may cause a web page for generating a game content acquisition request as shown in FIG. 14 to be displayed on the terminal device 30. FIG. 14 shows an example of a display screen of a web page for prompting a player of the game to generate a game content acquisition request and submit it to the server device 10. This display screen contains two display areas for "normal lottery" and "premium lottery," unlike the example shown in FIG. 8. For example, when player 1 operates the terminal device 30 to select the operation button 1402 captioned "Request Acquisition" displayed in relation to the heading "Normal Lottery," the terminal device 30 may generate a game content acquisition request including the deck selection information indicating use of deck 1-1 and send the generated game content acquisition request to the server device 10. On the other hand, when player 1 operates the terminal device 30 to select the operation button 1404 captioned "Request Acquisition" displayed in relation to the heading "Premium Lottery," the terminal device 30 may generate a game content acquisition request including the deck selection information indicating use of deck 1-2 and send the generated game content acquisition request to the server device 10. Thus, in this embodiment, a game content acquisition request sent from the terminal device 30 of player 1 may include deck selection information indicating which of deck 1-1 and deck 1-2 is to be used Further, the game content acquisition request may include the number of points such as game points to be consumed when a game content is acquired based on the game content acquisition request. For example, when the operation button 1402 is selected, a game content acquisition request including the number of consumed points 100; and when the operation button 1404 is selected, a game content acquisition request including the number of consumed points 300 is generated. For example, "normal lottery" may require in-game points that are provided in accordance with progression of the game, while "premium lottery" may require virtual currency.

When the server device 10 receives a game content acquisition request including deck selection information from the terminal device 30 of player 1, the processing proceeds to step 1302. In step 1302, the won game content selecting unit 54 specifies the deck to be used for selecting won game contents, based on the deck selection information included in the received game content acquisition request. For example, when the deck selection information includes deck identification information that identifies deck 1-1, deck 1-1 is specified as the deck to be used. Subsequently, in step 706, a won game content is selected from the game contents contained in the deck specified in step 1302, in accordance with a predetermined algorithm. After the won game content is selected, the same processing as in FIG. 7 is performed.

Thus, in this embodiment, each player may be allocated a plurality of decks of which one contains different types and number of game contents than another. Thus, each player can select desired decks based on the types and the number of contained game contents.

Next, a server device according to another embodiment of the present invention will be described with reference to FIG. 15. In this embodiment, a single deck may be shared by a plurality of players. Based on game content acquisition requests received from two or more players, won game contents are selected from the game contents contained in a deck shared by the players. In this embodiment, the deck identification information management table shown in FIG. 4 is replaced with a deck identification information management table shown in FIG. 15. Except the deck identification information management table, the server device according to this embodiment is configured in substantially the same manner as in the embodiment shown in FIGS. 1 to 10; and except the processing using the deck identification information management table, the server device according to this embodiment performs substantially the same processing as in the embodiment shown in FIGS. 1 to 10. Therefore, detailed descriptions shared with the embodiment shown in FIGS. 1 to 10 will be omitted.

As shown in FIG. 15, the deck identification information management table according to this embodiment may store deck identification information that identifies decks each allocated to one or more players in association with player identification information that identifies the players. For example, in the example shown in FIG. 15, deck identification information "D000001" is stored in association with player identification information "000001," "000021," and "000022." Accordingly, when receiving a game content acquisition request from any of player 1, player 21, and player 22, the won game content selecting unit 54 may select a won game content from the game contents contained in deck 1 identified by deck identification information "D000001."

Thus, in this embodiment, one deck may be shared by a plurality of players; and a plurality of players can cooperate with each other to acquire a game content having a high rarity value.

Next, a server device according to another embodiment of the present invention will be described with reference to FIG. 16. In this embodiment, after a predetermined condition assigned to each deck is satisfied, won game contents are selected by using a new deck including a larger number of types of game contents than a deck that has been used Herein, a new deck including a larger number of types of game contents than an old deck may also be referred to as "an extension deck."Further, the above "predetermined condition" assigned to determine whether to use an extension deck may also be referred to as "an extension condition."

In this embodiment, the contained game content information management table shown in FIG. 5 is replaced with a contained game content information management table shown in FIG. 16. Except the contained game content information management table, the server device according to this embodiment is configured in substantially the same manner as in the embodiment shown in FIGS. 1 to 10; and except the processing using the contained game content information management table, the server device according to this embodiment performs substantially the same processing as in the embodiment shown in FIGS. 1 to 10. Therefore, detailed descriptions shared with the embodiment shown in FIGS. 1 to 10 will be omitted.

FIG. 16 shows an example of a contained game content information management table for storing contained game content information on the game contents contained in an extension deck (extension deck 1) used instead of deck 1 when the extension condition is satisfied for deck 1 shown in FIG. 5. The extension conditions may be various; for example, an extension condition may be the same as any of the initializing conditions described above. For example, when the extension condition is the same as the initializing condition (a), upon selecting a game content having the highest rarity value in deck 1 as a won game content, extension deck 1 is assigned as a servicing deck instead of deck 1. FIG. 16 shows an example of extension deck 1 that is assigned as a servicing deck when the initializing condition (a) is satisfied In FIG. 16, the current contained number of game content 4 included in deck 1 is 0; therefore, game content 4 having the highest rarity value in deck 1 has been selected as a won game content, and thus the initializing condition (a) has been satisfied. After extension deck 1 is assigned as a servicing deck, the won game content selecting unit 54 selects a won game content from the game contents contained in extension deck 1.

As shown in FIG. 16, extension deck 1 contains two types of game contents that are not included in deck 1 (game content 7 identified by game content identification information "M000007" and game content 8 identified by game content identification information "M000008"). The rarity values and the aggregate contained numbers of game contents added to extension deck 1 are not limited to those shown in FIG. 16. Further, the number of types of game contents added is not limited to two as in FIG. 16, but may be 1, 3, or larger. In accordance with an aspect of this embodiment, when an extension condition is satisfied, a web page for generating and sending an assignment request for assigning an extension deck as a servicing deck may be sent from the server device 10 to a terminal device 30. When an assignment request generated based on operations on the web page is received from the terminal device 30, the extension deck may be assigned as a servicing deck.

Thus, when an extension condition is satisfied, the extension deck is assigned as a servicing deck; and after extension deck 1 is assigned as a servicing deck, a won game content is selected from the game contents contained in extension deck 1; therefore, a player is continuously attracted even after a game content having a high rarity value (e.g., a rare card) is selected or the current contained number of a game content has become small.

The invention has been explained based on the aspects deemed to be the most practical and desirable at the moment, but these explanations are directed only to explanation of the present invention and are not intended to limit the present invention to the disclosed embodiments. The explanations made herein are intended to include modifications within the purport and scope of the claims made to any feature of the above described embodiments and equivalents thereof. For example, combinations of a feature of any of the above described embodiments with one or more features of another embodiment are included in the scope of the present invention as far as possible.

An example of modification to the above embodiments will now be described. In accordance with an aspect of the present invention, when each player is allocated one deck as shown in FIG. 4, a web page for generating a game content acquisition request may be sent to the terminal device 30 of the player, the web page being able to generate two types of game content acquisition request as shown in FIG. 14. The game content acquisition request generated from this web page may include lottery type information indicating the type of lottery (that is, the type of lottery algorithm used by the won game content selecting unit 54). For example, the game content acquisition request generated when the operation button 1402 is operated by the player may include lottery identification information indicating "normal lottery" while the game content acquisition request generated when the operation button 1404 is operated by the player includes lottery identification information indicating "premium lottery." When the server device 10 receives a game content acquisition request from the terminal device 30, the won game content selecting unit 54 refers to the lottery type information included in the received game content acquisition request to specify the type of lottery requested. When the game content acquisition request includes lottery type information indicating "normal lottery" the same processing as in the embodiment shown in FIGS. 1 to 10 is performed. That is, a won game content may be selected from the deck allocated to the player. In contrast, when the game content acquisition request includes lottery type information indicating "premium lottery" a won game content may be selected in a method by which a game content having a high rarity value is more likely to be selected. For example, a won game content may be randomly selected from game contents having a rarity value of two or higher in a deck allocated to the player.

Thus, a game content acquisition request received from the terminal device 30 of the player may include lottery type information indicating different lottery methods; therefore, two or more types of different algorithms can be selectively used to select won game contents even if a single deck is used In the above example, the expected rarity values of won game contents to be selected may be different for the lottery algorithm corresponding to "normal lottery" and the lottery algorithm corresponding to "premium lottery." This difference corresponds to the difference in costs such as game points consumed by the player in the above lottery methods (see the statements regarding the points to be consumed in FIG. 14).

The processes and procedures described and illustrated herein may be implemented by software, hardware, or any combination thereof including those explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

Even if processes and procedures are described and illustrated herein to be executed by a single device, software piece, component, or module, such processes and procedures may also be executed by a plurality of devices, software pieces, components, and/or modules. Also, even if data, table, or database are described and illustrated herein to be stored in a single memory, such data, table, or database may also be distributed to and stored in a plurality of memories included in a single device or a plurality of memories located in a plurality of devices in a distributed manner. Furthermore, the elements of the software and hardware elements described and illustrated herein may also be integrated into a smaller number of constituent elements or separated into a larger number of constituent elements.

If it is herein described that the invention comprises either one element or a plurality of elements, the invention may comprise either one element or a plurality of elements.

What is claimed is:

1. A server device for providing a game to be played using game contents to a plurality of players via a network, the server device comprising:
   one or more processors; and
   at least one memory device configured to store instructions which when executed by the processor, causes the one or more processors to:
      at an initial point of time, allocate a plurality of game contents to a plurality of players such that each player is allocated a deck of game contents with a plurality of different kinds of game contents;
      for each of the plurality of different kinds of game contents associated with each deck, store in a database an aggregate contained number, and a current contained number, wherein the aggregate contained number indicates the total number of game contents for a corresponding kind of game contents that were initially allocated to the deck at the initial point of time, and the current contained number indicates the remaining number of game contents for that corresponding kind of game contents that are currently contained in the deck after the initial point of time;
      after the initial point of time, receive a request from a terminal device of a first player to acquire game content from a first deck allocated to the first player;
      in response to the request, randomly select a first number of game content from the first deck allocated to the first player and provide the selected game content to the first player;
      cause the terminal device of the first player to display information indicating said current contained number and said aggregate contained number for each of the plurality of the different kinds of game contents within the first deck allocated to the first player;
      store in the database the selected game content in association with first player identification information identifying the first player; and
      update the first deck allocated to the first player by clearing the selected game content from the database.

2. The server device of claim 1,
   updating the first deck allocated to the first player further includes updating a first current contained number corresponding to the selected game content by subtracting the first number from the first current contained number.

3. The server device of claim 1, wherein the instructions stored in the at least one memory device, when executed, further causes the one or more processors to initialize the first deck for the first player, if an initializing request is received from the terminal device of the first player after an initializing condition for initializing the first deck for the first player is satisfied.

4. The server device of claim 1 wherein the game content request received from the terminal device indicates one of a first lottery algorithm and a second lottery algorithm to be used for the selection of the first number of game content, wherein the first lottery algorithm has a higher chance of selecting one of the plurality of different kinds of game contents than the second lottery algorithm.

5. The server device of claim 4,
   wherein the first player is allocated a second deck of the game contents, the second deck of the game contents being different from the first deck of the game contents, and wherein selecting the first number of game content in response to the game content acquisition request includes selecting the first number of game content from the first deck and not from the second deck.

6. The server device of claim 4,
   wherein a rarity value is assigned to individual ones of the plurality of game contents contained in the first deck allocated to the first player,
   and wherein the first lottery algorithm and the second lottery algorithm are configured such that an expected rarity value of the first won game content selected by using the first lottery algorithm is different from an expected rarity value of the first won game content selected by using the second lottery algorithm.

7. The server device of claim 6, wherein cost consumed by the first player using the first lottery algorithm is different from cost consumed by the first player using the second lottery algorithm.

8. The server device of claim 1, wherein the one or more processors are further configured to:
   allocate the a deck to a second player;
   after the initial point of time, receive a second request from a terminal device of the second player to acquire game content from the first deck allocated to the second player;
   in response to the second request, randomly select a second number of game content from the first deck allocated to the second player and provide the selected game content to the second player; and
   store in the database the selected second number of game content in association with second player identification information identifying the second player.

9. A method using a computer for providing a game using game contents to a plurality of players via a network, the method being implemented in a processor configured to execute computer programs, the method comprising:
   at an initial point of time, allocating by the processor a plurality of game contents to a plurality of players such that each player is allocated a deck of game contents with a plurality of different kinds of game contents;
   for each of the plurality of different kinds of game contents associated with each deck, storing in a database an aggregate contained number, and a current contained number, wherein the aggregate contained number indicates the total number of game content for a corresponding kind of game contents that were initially allocated to the deck at the initial point of time, and the current contained number indicates the remaining number of game content for that corresponding kind of game contents that are currently contained in the deck after the initial point of time;
   after the initial point of time, receiving a request from a terminal device of a first player to acquire game content from a first deck allocated to the first player;
   in response to the request, randomly selecting a first number of game content from the deck allocated to the first player and provide the selected game contents to the first player;

causing the terminal device of the first player to display information indicating said contained number and said aggregate contained number for each of the plurality of the different kinds of game content within the first deck allocated to the first player;

storing in the database the selected game content in association with first player identification information identifying the first player; and updating the first deck allocated to the first player by clearing the selected game content from the database.

10. A server device for providing a game using a game content to a plurality of players via a network, the server device comprising:

one or more processors; and at least one memory device configured to store instructions which when executed by the processor, causes the one or more processors to:

at an initial point of time, allocating a plurality of game contents to a plurality of players such that each player is allocated a first deck of game contents with a plurality of different kinds of game contents;

for each of the plurality of different kinds of game contents associated with each deck, storing in a database contained game content information including an aggregate contained number, and a current contained number, wherein the aggregate contained number indicates the total number of game content for a corresponding kind of game contents that were initially allocated to the deck at the initial point of time, and the current contained number indicates the remaining number of game content for that corresponding kind of game contents that are currently contained in the deck after the initial point of time;

after the initial point of time, receiving a first request from a terminal device of a first player to acquire game content from a first deck allocated to the first player;

in response to the first request, randomly selecting a first number of game content from the first deck allocated to the first player and provide the selected first number of game content to the first player;

after the initial point of time, receiving a second request from a terminal device of the first player to acquire game content from the first deck allocated to the first player;

in response to the second request, randomly selecting a second number of game content from the first deck allocated to the first player and provide the selected game second number of game content to the first player;

store in the database the selected game content in association with first player identification information identifying the first player; and updating the contained game content information such that a first current contained number is updated by subtracting the first number from the first current contained number, and a second current contained number is updated by subtracting the second number from the second current contained number; and providing, to a terminal device of the first player, information indicating the a current contained number and an aggregate contained number for each of the plurality of different kinds of game contents associated with the first deck.

11. A server device for providing a video game to terminal devices of a plurality of players via a network, the server device comprising:

one or more processors; and at least one memory device configured to store instructions which when executed by the processor, causes the one or more processors to:

at an initial point of time, allocate a plurality of game contents to a plurality of players such that each player is allocated a deck of game contents with a plurality of different kinds of game contents;

for each of the plurality of different kinds of game contents associated with each deck, manage contained game content information, the contained game content information including a current contained number that indicates a number of game content for a corresponding kind of game contents that are currently contained in the deck after the initial point of time after the initial point of time, receive a request from a terminal device of a first player to acquire game content from a first deck allocated to the first player;

in response to the request, randomly select a first number of game content from the first deck allocated to the first player and provide the selected game content to the first player;

store in the database the selected game content in association with first player identification information identifying the first player; and update the contained game content information for the first deck by subtracting the first number from a first contained content number corresponding to the selected game content;

provide the contained game content information for the first deck to the terminal device of the first player; and initialize the first deck for the first player, if an initializing request is received from the terminal device of the player after an initializing condition for initializing the first deck for the first player is satisfied.

12. The server device of claim 11, wherein the contained game content information includes rarity information of the game contents in the decks, and wherein the at least a part of the contained game content information that is provided to the terminal device of the first player includes the rarity information of obtainable game contents in the decks.

13. The server device of claim 11, wherein storing the selected game content includes updating the selected game contents of the first player so as to reflect an exchange of game contents between the first player and a player other than the first player, the exchange being performed in the video game.

14. The server device of claim 11, wherein the instructions stored in the at least one memory device, when executed, further causes the one or more processors to progress the video game based on information on progression of the game stored in association with the individual ones of the plurality of players.

15. A server device for providing a video game to terminal devices of a plurality of players via a network, the server device comprising:

one or more processors; and at least one memory device configured to store instructions which when executed by the processor, causes the one or more processors to:

at an initial point of time, allocating a plurality of game contents to a plurality of players such that each player is allocated a deck of game contents with a plurality of different kinds of game contents;

for each of the plurality of different kinds of game contents associated with each deck, managing contained game content information, the contained game content information including a current contained number that indicates a number of game content for a corresponding kind of game contents that are currently contained in the deck after the initial point of time
storing points owned by the individual ones of the plurality of players, in association with the individual ones of the plurality of the players;
after the initial point of time, receiving a request from a terminal device of a first player to acquire game content from a first deck allocated to the first player;
in response to the request, randomly selecting a first number of game content from the first deck allocated to the first player and provide the selected game content to the first player;
storing in a database the selected game content in association with the first player as owned game contents of the first player;
updating the contained game content information for the first deck by subtracting the first number from a first contained content number corresponding to the selected first number of game content;
providing, to the terminal device of the first player, at least a part of the contained game content information; and
initializing the first deck for the first player, if an initializing request is received from the terminal device of the player after an initializing condition for initializing the first deck for the first player is satisfied,
wherein storing the selected game content includes updating the owned game contents of the first player so as to reflect an exchange of game contents between the first player and a player other than the first player, the exchange being performed in the video game.

16. A method using a computer for providing a video game to terminal devices of a plurality of players via a network, the method being implemented in one or more processors configured to execute computer programs, the method comprising:
  at an initial point of time, allocating by the processor a plurality of game contents to a plurality of players such that each player is allocated a deck of game contents with a plurality of different kinds of game contents;
  for each of the plurality of different kinds of game contents associated with each deck, managing contained game content information, the contained game content information including a current contained number that indicates a number of game content for a corresponding kind of game contents that are currently contained in the deck after the initial point of time
  after the initial point of time, receiving a request from a terminal device of a first player to acquire game content from a first deck allocated to the first player;
  in response to the request, randomly selecting a first number of game content from the first deck allocated to the first player and provide the selected game content to the first player;
  storing in a database the selected game content in association with the first player as owned game contents of the first player; and
  updating the contained game content information for the first deck by subtracting the first number from a first contained content number corresponding to the selected first number of game content;
  providing at least a part of the contained game content information for the first deck to the terminal device of the first player; and
  initializing the first deck for the first player, if an initializing request is received from the terminal device of the player after an initializing condition for initializing the first deck for the first player is satisfied.

* * * * *